United States Patent [19]
Tucker et al.

[11] Patent Number: 5,692,154
[45] Date of Patent: Nov. 25, 1997

[54] CIRCUIT FOR MASKING A DIRTY STATUS INDICATION PROVIDED BY A CACHE DIRTY MEMORY UNDER CERTAIN CONDITIONS SO THAT A CACHE MEMORY CONTROLLER PROPERLY CONTROLS A CACHE TAG MEMORY

[75] Inventors: Brian B. Tucker, The Woodlands; Gary W. Thome, Tomball, both of Tex.

[73] Assignee: Compaq Computer Corporation, Houston, Tex.

[21] Appl. No.: 645,921

[22] Filed: May 14, 1996

Related U.S. Application Data

[63] Continuation of Ser. No. 171,910, Dec. 20, 1993, abandoned.

[51] Int. Cl.[6] .................... G06F 11/20; G06F 12/00
[52] U.S. Cl. .................... 395/468; 364/DIG. 1; 364/DIG. 2; 364/243.4; 395/468; 395/420; 395/182.01
[58] Field of Search .................... 364/DIG. 1, DIG. 2, 364/243.45, 243.4, 964.342; 395/444, 182.01, 445, 468, 472, 479, 420, 462

[56] References Cited

U.S. PATENT DOCUMENTS

| | | | |
|---|---|---|---|
| 4,959,777 | 9/1990 | Holman, Jr. .................... | 395/425 |
| 4,995,041 | 2/1991 | Hetherington et al. .................... | 371/40.1 |
| 5,056,041 | 10/1991 | Guttag et al. .................... | 364/518 |
| 5,138,617 | 8/1992 | Edwards .................... | 371/16.1 |
| 5,167,029 | 11/1992 | Eikill et al. .................... | 395/425 |
| 5,369,753 | 11/1994 | Tipley .................... | 395/425 |
| 5,404,489 | 4/1995 | Woods et al. .................... | 395/479 |
| 5,423,019 | 6/1995 | Lin .................... | 395/425 |

OTHER PUBLICATIONS

Intel Corp., 82420 PCI Set Cache/Memory Subsystem, Entire Book, 1993.

*Primary Examiner*—Tod R. Swann
*Assistant Examiner*—Tuan V. Thai
*Attorney, Agent, or Firm*—Pravel, Hewitt, Kimball & Krieger

[57] ABSTRACT

Circuitry which corrects a problem in the 82424TX Cache and Dram Controller (CDC) from Intel with the addition of only minor circuitry which can be used externally or internally and which allows proper operation under all conditions. Combinatorial logic is provided to block the dirty bit provided by the dirty Static Random Access Memory (SRAM) when the processor is performing a noncacheable access as indicated by the Page Cache Disable (PCD) bit. In certain cases the PCD bit is ignored and the stored dirty bit is passed without blocking: when the AHOLD signal is asserted, indicating that an address snoop operation is occurring, and when the BOFF* signal is asserted, indicating that a cache flush or writeback operation is occurring. Thus, the dirty bit provided by the dirty SRAM when the processor is performing a non-cacheable access is selectively blocked in certain instances to ensure cache coherency.

8 Claims, 2 Drawing Sheets

CIRCUIT FOR MASKING A DIRTY STATUS INDICATION PROVIDED BY A CACHE DIRTY MEMORY UNDER CERTAIN CONDITIONS SO THAT A CACHE MEMORY CONTROLLER PROPERLY CONTROLS A CACHE TAG MEMORY

"This is a continuation of U.S. Ser. No. 08/171,910 application Ser. No. 08/171,910 filed on Dec. 20, 1993," now abandoned.

BACKGROUND OF THE INVENTION

1. Field of the Invention

The invention relates to computer systems, and particularly to computer systems having writeback cache subsystems, and more particularly to a cache subsystem which may allow cache incoherencies to occur in certain instances and a circuit to correct the incoherency cases.

2. Description of the Related Art

Modern personal computer systems are becoming quite powerful. Users are pushing manufacturers to develop ever more powerful computers. Indeed, the push often results in standards becoming unsatisfactory within a short time. One such example is the conventional architecture for IBM PC compatible computers, where the processor and memory are connected on one bus referred to as the host or local bus and the input/output (I/O) systems are connected on another bus, such as the ISA bus developed by IBM in the PC/AT or the EISA bus. The demands being placed on the various I/O systems can exceed the capabilities of the ISA or EISA buses, so a new bus has been developed.

The new bus is referred to as the Peripheral Component Interconnect or PCI bus. The PCI bus is a newly developed bus which is a mezzanine bus between the host or local bus and the I/O bus, such as the EISA or ISA bus. Being a newly designed bus, the PCI bus has many advantages over the ISA and EISA buses, mainly in performance and ability to allow bus mastering, and has advantages over the host bus, mainly in electrical loadings and multiple vendor support.

As this is a new bus, new chips must be developed according to its standards. In a PCI architecture, the processor and memory are connected together and to a processor to PCI bridge. The processor bridge acts as the memory controller and also does any necessary conversion between the specific processor and the PCI standard. Similarly, a PCI to EISA or PCI to ISA bridge is included in the computer system to allow use of the large number of existing I/O devices and software, those for which performance requirements have not hit the limits. The PCI bus also receives various systems directly, particularly the graphics system but also the hard disk drive and network interface systems.

Intel Corporation has developed chipsets according to the PCI standard allowing use of the various Intel processors, such as the 486™ family and the PENTIUM®. In developing these chipsets, Intel developed processor bridges. In addition to operating as memory controllers for the main memory and as the interface between the processor and the PCI bus, the processor bridges also include cache controller logic to allow inclusion of second level (L2) caches in the computer systems. The cache systems allow a further increase in performance of the computer system, as well known. The particular chipset developed by Intel for use with 486™ family processors includes the 82424TX Cache and DRAM Controller (CDC) and the 82423TX Data Path Unit (DPU). The chips are designed to directly interface with the 486 processor and the PCI bus, as well as DRAM forming the main memory. In addition, the CDC is designed to operate as the controller for a writeback cache. External SRAMs are used as the cache data RAMs, the tag RAMs and the valid and dirty bit RAMs. The tag RAMs store the particular address bits used to form the cache tag, while the valid RAM stores the valid or invalid status of the particular cache line related to the stored tag. The dirty RAM serves the function of storing an indication whether the particular cache line is dirty or clean, as required in a writeback cache. Clean status indicates that the information in the cache is coherent with the copy in the main memory, while dirty status indicates that the value in the cache is the current copy and the copy in the main memory is stale and should not be used.

One function of a cache controller is to snoop operations being executed by a bus master other than the associated processor so that should the bus master request data at an address contained in the cache or write data to an address that is in the cache, the cache system can take the proper action to avoid a cache incoherency, where the cache and the main memory have different data but this status is not known to the cache system. In the case of snoop read hits in a writeback cache, the cache controller takes over operation and provides the requested data from the cache data RAMs to the main memory and then allows the read cycle to continue. In the case of a cache snoop write hit, the line or entry in the cache is invalidated, so that it is not accidently retrieved by the processor. By snooping and properly setting the valid and dirty bits, the cache controller can keep the cache coherent, so that improperly different data cannot be obtained.

One other complicating factor in a cache environment is the presence of noncacheable areas of memory. Most often these areas are memory-mapped I/O ports, such as dual-ported RAM used by a disk controller or network interface controller (NIC). The data can be changed by local processors in the subsystems without accessing the system bus. Therefore the cache controller cannot snoop these operations and cache incoherencies could readily develop. The solution is to set these memory areas as noncacheable, so that no entries are made in the cache and the contents are always directly obtained from the memory location. This noncacheable status can be done entirely in hardware, using various noncacheable inputs of a cache controller. However, this solution may not be sufficiently flexible. Intel included the capability for software alone to indicate a noncacheable range in the 386™ family of processors and all those compatible therewith. One way this capability is exercised is to set the PCD or page cache disable bit in the page table entry used to define a particular memory page in various modes of operation of 386-compatible processors. With the bit set, then the memory page is to be interpreted as being noncacheable, even though the hardware noncacheable input is not asserted.

It has been determined that under certain conditions the 82424TX CDC does not operate properly and cache incoherencies can result. One particular case that has been determined occurs as follows. A PCI bus master performs a write operation to a first memory location that is stored in the cache system. As a result the 82424TX invalidates the first cache line corresponding to that first memory location. Shortly thereafter the processor performs a read operation with the PCD bit set, with the operation directed to a second memory location which maps to a second cache line. The read operation is a cache miss and the line currently in the cache is valid and dirty. While the 82424TX should not perform any operation to the cache as the operation is indicated as being noncacheable, the 82424TX instead proceeds to perform some of the operations to allocate the new memory address to the cache, but not all of them. It performs the writeback operation to the memory location corresponding to the dirty cache line and then proceeds to provide new tag values and new valid bit values, along with the appropriate write and chip enable signals, so that the new address, the supposedly noncacheable address, is used as the tag value and the location is set to a valid state. However, the 82424TX does not at the same time also provide the dirty bit write enable and chip enable signals needed to store a new dirty bit so that the location is clean. Nor does the 82424TX provide write and chip enable signals to the cache data RAMs, so that the data is also not stored. Thus the line ends up being indicated as being dirty and valid, with the tag values indicating the second memory address, while the data is that for a third memory address, that which was previously present in the cache line. Then if the cache system is flushed, as part of the flushing process the 82424TX will encounter the incoherent line, note that it is valid and dirty, so that the data must be written back to the main memory. So then the data from the third memory location is written to the second memory location. Thus the second location has ended up with completely improper data and bad results can very likely occur.

This is not an impossible scenario, as it has been determined to occur in a number of commercially available computer programs. Therefore some solution must be developed to correct the incoherency problem without requiring a major redesign, or indeed any redesign, of the 82424TX, which would result in a delay in the full scale production of the chip and of systems using the chip.

SUMMARY OF THE INVENTION

A computer system according to the present invention corrects the problem noted above as existing in the 82424TX CDC from Intel with the addition of only minor circuitry which can be used externally or internally and which allows proper operation under all conditions.

Combinatorial logic is provided to block the dirty bit provided by the dirty SRAM when the processor is performing a noncacheable access as indicated by the PCD bit. The CDC then operates properly and does not improperly perform a tag allocation cycle so that the cache incoherency does not result.

However, because of the operation of the PCD signal from the processor in other circumstances, the PCD bit must be ignored and the stored dirty bit must be passed without blocking in two cases. The two cases are when the AHOLD signal is asserted, indicating that an address snoop operation is occurring, and when the BOFF*signal is asserted, indicating that a cache flush or writeback operation is occurring. During the period when the BOFF, signal is asserted, the PCD signal is floated or undriven and so must be ignored. During snoop operations using the AHOLD signal, the processor also floats the PCD signal, so that again the PCD signal must be ignored as it may be at any level and not necessarily be related to the particular address being snooped. The combinatorial logic addresses all of these cases, so that the 82424TX does not develop the cases where cache incoherency may result. Thus the circuitry corrects certain cases of cache incoherency.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
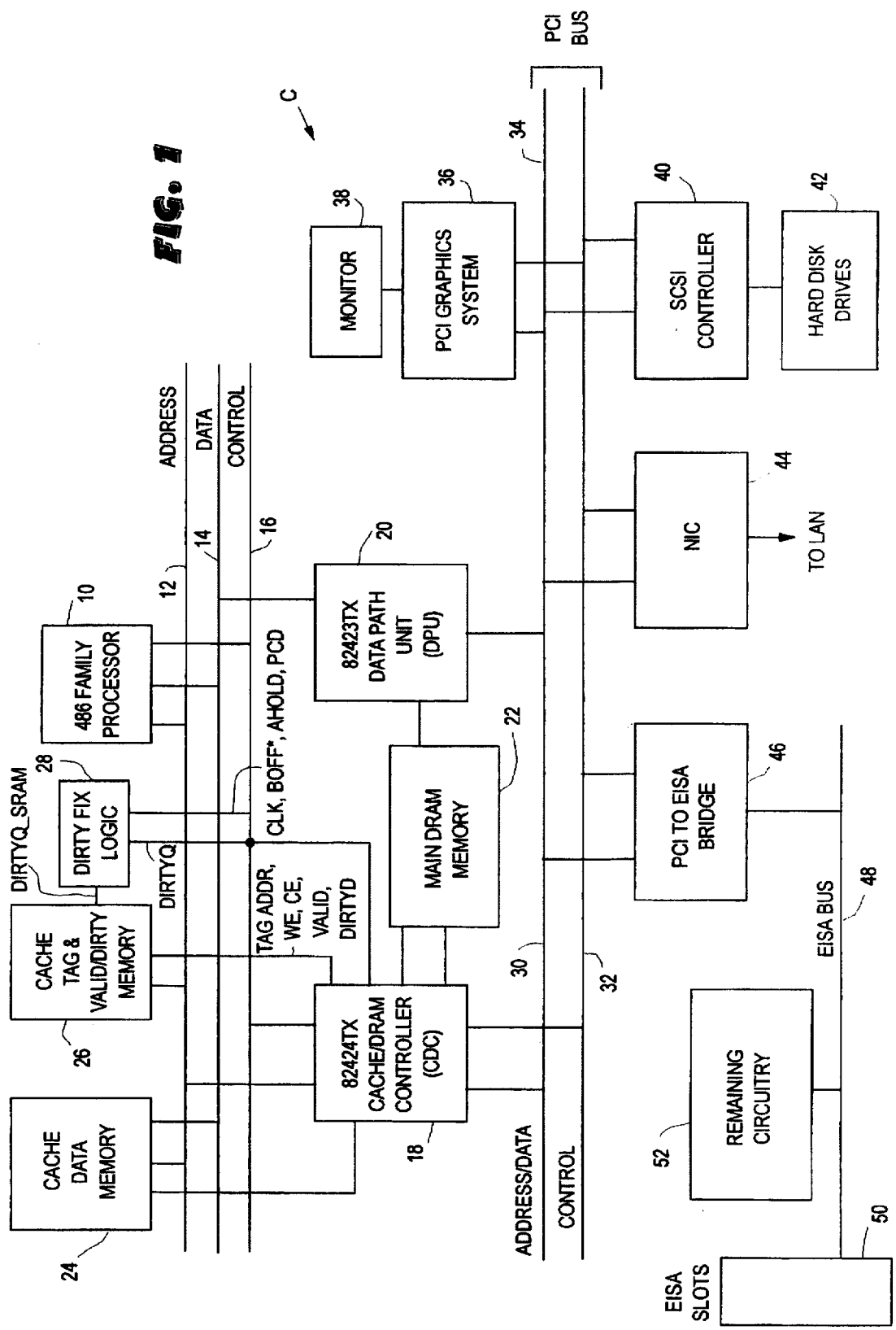
FIG. 1 is a block diagram of a computer system according to the present invention.

Referring now to FIG. 1, a computer system C according to the present invention is illustrated. The computer system C is illustrative of a design utilizing the 82424TX CDC as described in the background. It is understood that other variations utilizing the component can be developed. Computer system C includes a 486™ family processor 10. This can include the processors such as the 486DX™, 486SX™ and 486DX2™ as developed by Intel Corporation. The processor 10 is connected to address, data and control buses 12, 14 and 16. Also connected to the address, data and control buses 12, 14 and 16 are an 82424TX cache/DRAM controller (CDC) 18 and an 82423TX data path unit (DPU) 20. Details of the operation and features of these two parts can be obtained by reference to the 82420 PCIset Cache/Memory Subsystem Memory data book from Intel Corporation having a copyright date of 1993. Briefly, the CDC 18 and DPU 20 act as the memory controller and processor to PCI bridge in the computer system C. The main DRAM memory 22 is connected to the CDC 18 and DPU 20 according to the information provided in the data from Intel. This means that the memory addresses and memory control signals are provided by the CDC 18, while the data pins are connected to the DPU 20.

Figure 2:
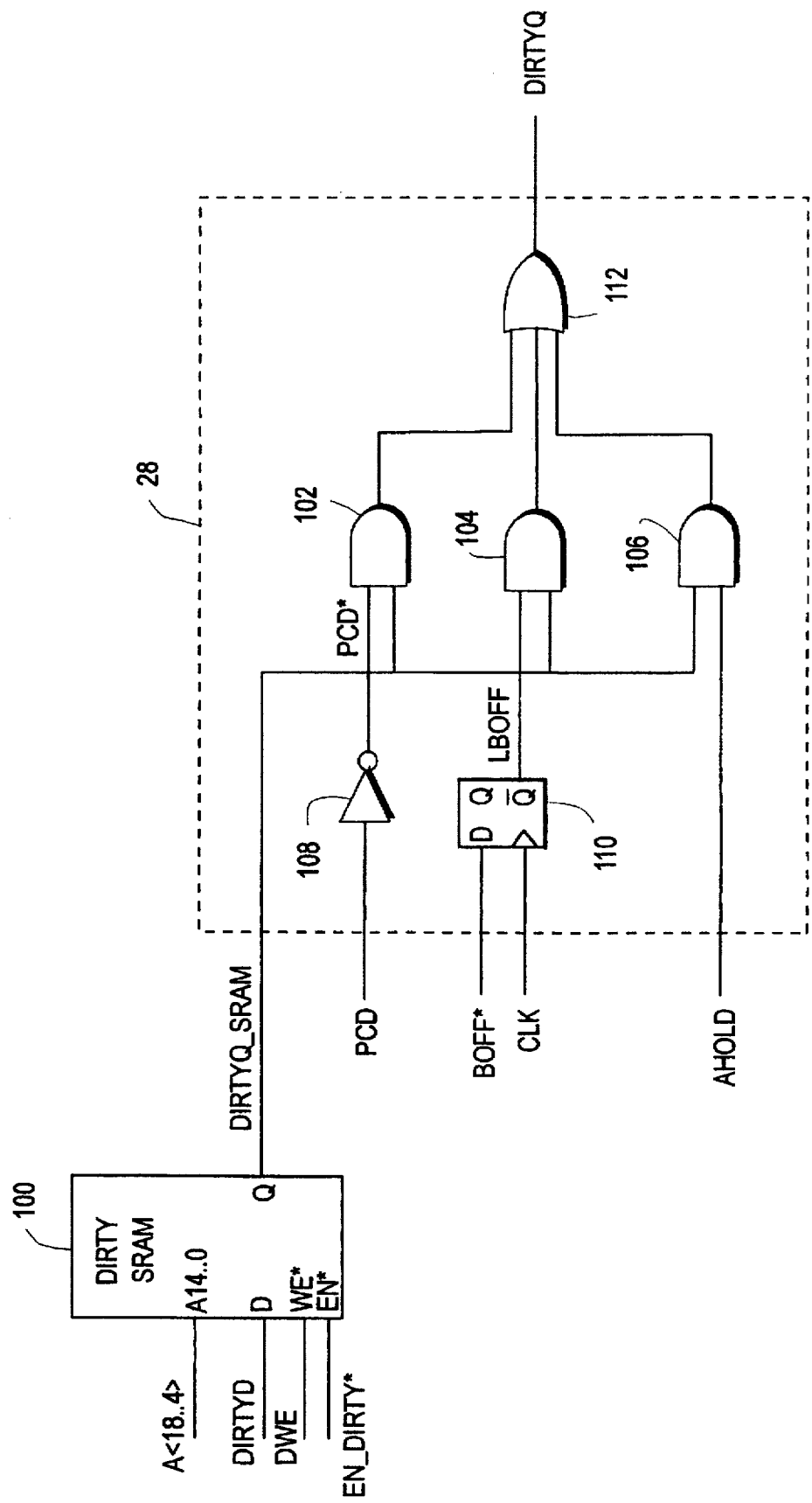
FIG. 2 is a schematic diagram of the dirty fix logic of FIG. 1.

In addition to being the controller for the main DRAM memory 22, the CDC 18 also includes a cache memory controller. Preferably it is activated in writeback mode as the processor 10 operates only in writethrough mode. To further develop the cache subsystem, cache data memory 24 is connected to the address bus 12 and the data bus 14 and receives control signals from the CDC 18. These control signals are those indicated in the Intel data book include the write enable and chip enable signals for the memory chips. Preferably the cache data memory 24 is 256 kbytes of SRAM. In addition to the cache data memory 24, other SRAM devices are utilized to develop the cache tag and valid/dirty memory 26. The cache tag memory is utilized to store the tag values as well known according to cache operation. In addition to maintaining the tags, the cache tag and valid/dirty memory 26 also contains memory devices to indicate whether the particular line in the cache is valid or invalid and whether the line is clean or dirty. In the preferred embodiment, the tag values and valid bit are contained in a pair of SRAM devices, while the dirty bit is maintained in a separate SRAM device 100 (FIG. 2). The cache tag and valid/dirty memory 26 is connected to the address bus 12 and receives control signals including the tag addresses, the appropriate write enable and chip enable signals, the valid signal and a signal referred to as DIRTYD or the next dirty status from the CDC 18.

For purposes of this disclosure the cache tag and valid/dirty memory 26 provides an output referred to as the DIRTYQ_SRAM signal, which is the output of the dirty SRAM 100 to indicate the stored dirty or clean status of the particular cache line. The DIRTYQ_SRAM signal is provided to dirty fix logic 28 which is provided to solve the incoherence problem as described in the background. The dirty fix logic 28 is connected to the control bus 16 and receives the CLK, BOFF*, AHOLD and PCD signals as provided to or from the processor 10. Additionally, the dirty fix logic 28 provides the DIRTYQ signal to the CDC 18. As can be seen, the dirty fix logic 28 is inserted between the cache tag and valid/dirty memory 26 and the CDC 18 to correct the incoherency problem by properly driving the DIRTYQ signal.

The CDC 18 and DPU 20 are also connected to an address/data bus 30 and a control bus 32 of a PCI bus 34. Additionally, the PCI bus 34 is preferably developed according to the PCI 2.0 specification as provided by Intel Corporation. Additionally connected to the PCI bus 34 is a PCI graphics system 36 which in turn is connected to a monitor 38. Further, a SCSI controller 40 is connected to the PCI bus 34 and has connected to it a plurality of hard disk drives 42 or other SCSI devices. A network interface controller or NIC 44 is connected to the PCI bus 34 and to the appropriate local area network (LAN). Preferably the SCSI controller 40 and the NIC 44 operate as PCI bus masters. A PCI to EISA bridge 46 is also connected to the PCI bus 34 and provides the necessary signals to develop an EISA bus 48. Numerous EISA slots 50 are connected to the EISA bus 48 and the remaining conventional input/output (I/O) circuitry 52 as developed in a personal computer is preferably connected to the EISA bus 48 in a conventional fashion. These remaining portions of the computer system C are shown for illustration and other variations could readily be developed. It is noted that there are a plurality of bus masters which are operating on the PCI bus 34, such as the SCSI controller 40, the NIC 44 and the PCI to EISA bridge 46, assuming that DMA operations are performed by the remaining circuity 52 or a bus master is located in an EISA slot 50.

Referring now to FIG. 2, the detailed circuitry in the dirty fix logic 28 is illustrated. The dirty SRAM 100 receives at its address inputs the appropriate address signals from the address bus 12. The DIRTYD signal from the CDC 18 is received at the D input of the SRAM 100 to indicate the next clean or dirty status of the particular cache line. The DWE signal is received at the active low write enable input of the dirty SRAM 100 and is provided by the CDC 18 according to its specifications. Finally, the EN_DIRTY* signal is connected to the active low chip enable input of the dirty SRAM 100 and is the appropriate chip enable signal from the CDC 18. The output of the dirty SRAM 100 is the DIRTYQ_SRAM signal as noted in the discussion of FIG. 1. This signal is provided as one input to each of three AND gates 102, 104 and 106 contained in the dirty fix logic 28. The PCD or page cache disable signal is provided as the input to an inverter 108, whose output is connected to the second input of the AND gate 102. The AHOLD signal is provided as the second input to the AND gate 106, while a signal referred to as LBOFF or latched backoff is provided as the second input to the AND gate 104. The LBOFF signal is provided at the inverting output of a D-type flip-flop 110 whose D input receives the BOFF* signal and which is clocked by the CLK signal. The outputs of the AND gates 102, 104 and 106 are provided as the inputs to a three input OR gate 112, whose output is the DIRTYQ signal which is provided to the CDC 18.

The operation of the dirty fix logic 28 is as follows. If the processor 10 is indicating that the particular page is non-cacheable as indicated by the PCD bit, the DIRTYQ signal is set at a low level indicating a clean line if neither a BOFF*nor an AHOLD cycle is occurring. This basic condition guarantees that the CDC 18 receives a masked DIRTYQ signal if the PCD signal is high and snoop, flush or writeback operations are not occurring. Under those conditions the CDC 18 will not perform an allocate cycle and will not perform a writeback operation but does operate with the main memory. If however, the AHOLD signal is asserted by the CDC 18, indicating that a snoop operation is occurring and the CDC 18 is accessing the cache tag and valid/dirty memory 26, then the state of the DIRTYQ_ SRAM signal is passed through to the DIRTYQ signal via the AND gate 106. This is necessary so that the snooping logic in the CDC 18 can determine whether a read hit has occurred, so that a writeback operation can occur if necessary. The use of the AHOLD signal is noted as being necessary because the 486 family processors 10 floats the PCD bit during AHOLD operations. If only the AND gate 102 were utilized, in certain cases the line would be indicated as being clean when in fact it was dirty because the PCD bit could improperly be determined to be at a high level, thereby blocking the DIRTYQ_SRAM signal. Thus the AND gate 106 is used to override the AND gate 102.

In a like manner, the DIRTYQ_SRAM signal is passed through during backoff operations which develop under two conditions. First, backoff is utilized after an AHOLD cycle when it has been determined that a writeback cycle is necessary. The CDC 18 backoffs the processor 10 to gain full access to the address, data and control bus 12, 14 and 16 to perform the read operation, so that the data can be copied from the cache data memory 24 to the main DRAM memory 22 before the PCI bus master continues. The second condition is when the WBINVD or INVD instructions, that is writeback invalidate or invalidate instructions, of the processor 10 have been executed. These instructions cause a flush of the cache system. Because this flush operation may take a great time, the CDC 18 asserts the BOFF* signal to gain complete control of the buses 12, 14 and 16 to allow the most efficient operation of the flush procedure. It is noted that when the BOFF*signal is asserted, the processor 10 tristates all of its outputs, particularly including the PCD signal. Therefore under this condition the PCD signal can no longer be considered a valid signal as it is in an undriven state and the actual input value received at the inverter 108 is an unknown. Therefore there could conditions where it would be possible that the PCD signal would be received at a high level so that an invalid state for the DIRTYQ signal would result if the AND gate 104 were not utilized. Thus the AND gate 104 overrides the AND gate 102 during backoff operations.

Recalling the problem sequence of operations described in the background, the bus master again performs the cache hit write cycle, causing a line invalidation. Then the processor reads a different memory location with the PCD bit set. With the dirty fix logic 28, the 82424TX receives an indication that the line is clean. Thus it does not writeback the data and does not perform the partial allocation cycle. Rather it simply performs as intended and reads the data from the requested location. The tag values are not updated, so no cache incoherency results.

Therefore the dirty fix logic 28 addresses the particular problem found, that is that the CDC 18 does not properly utilize the PCD signal during certain cases as described above, but also includes certain other logic to override the PCD DIRTYQ correction logic during certain operations where the actual status of the DIRTYQ signal must be maintained.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:
1. A computer system comprising:
a processor having a page cacheable status signal indicative of a cacheable status of a page and inputs for receiving signals for releasing address lines and for releasing address, data and control lines, said inputs for receiving signals indicative of snoop or cache flush operations;
a bus master; and
a cache system including:
a writeback cache memory controller connected to said processor and said bus master for monitoring operations of said processor and maintaining said cache system and for monitoring operations of said bus master and maintaining said cache system;
cache data memory connected to said cache memory controller and coupled to said processor and to said bus master
cache tag memory connected to said cache memory controller for storing tag values associated with data stored in said cache system;
cache valid memory connected to said cache memory controller for storing a valid status of data stored in said cache system;
cache dirty memory connected to said cache memory controller for storing a signal indicating a dirty status of data stored in said cache system;
said cache controller improperly controlling said cache tag memory under predetermined certain conditions, including performance of non-cacheable operations when snoop or cache flush operations are not occurring; and
a masking circuit having:
a first gate receiving at a first input said dirty status signal from said cache dirty memory and at a second input an indication developed from said page cacheable status signal that said page is not cacheable;
a second gate receiving at a first input said dirty status signal from said cache dirty memory and at a second input an indication that said releasing address, data and control lines signal is asserted; and
a third gate receiving at a first input said dirty status signal from said cache dirty memory and at a second input an indication that said releasing address lines signal is asserted;
said circuit providing said cache dirty status signal under normal operations to said cache memory controller, said circuit masking said cache dirty status signal when a non-cacheable operation is occurring unless either a snoop operation or a cache flush operation is occurring so that said cache memory controller properly controls said cache tag memory.

2. The computer system of claim 1, wherein said processor provides an indication that a memory location is non-cacheable and wherein said masking circuit operates to mask dirty status when said memory location is non cacheable.

3. The computer system of claim 2, wherein said processor includes an input for allowing said cache memory controller to access said cache tag memory, wherein said cache memory controller includes an output connected to said processor cache tag memory access input and wherein said masking circuit operates to pass dirty status from said cache dirty memory unmasked when said cache memory controller is accessing said cache tag memory.

4. The computer system of claim 2 further comprising a data storage device coupled to said processor, said data storage device receiving data stored in said cache memory controller and said cache memory.

5. The computer system of claim 2 further comprising a video display device coupled to said processor, said video display device receiving data from said cache memory controller and said cache memory.

6. The computer system of claim 1, wherein said cache dirty memory includes an output for providing a dirty status signal, wherein said cache memory controller includes an input for receiving a cache dirty status signal, wherein said processor includes an output for providing a page cacheable status signal indicative of a cacheable status of a page and inputs for receiving signal for releasing address lines and for releasing address, data and control lines, and wherein said circuit for masking includes:
a first AND gate receiving at a first input said dirty status signal from said cache dirty memory and at a second input an indication developed from said page cacheable status signal that said page is not cacheable and providing an output signal;
a second AND gate receiving at a first input said dirty status signal from said cache dirty memory and at a second input an indication that said releasing address, data and control lines signal is asserted and providing and output signal;
a third AND gate receiving at a first input said dirty status signal from said cache dirty memory and at a second input an indication that said releasing address lines signal is asserted and providing an output signal; and
an OR gate receiving the outputs of said AND gates at the inputs of said OR gate and having an output providing said cache dirty status signal to said cache memory controller.

7. The computer system of claim 1, wherein said cache memory controller is located on a single integrated circuit and wherein said means for masking dirty status is located external to said single integrated circuit.

8. In a computer system having a processor, a bus master, and a cache system, the cache system including a writeback cache memory controller connected to said processor and said bus master for monitoring operations of said processor and maintaining said cache system and for monitoring operations of said bus master and maintaining said cache system, cache data memory connected to said cache memory controller and coupled to said processor and to said bus master, cache tag memory connected to said cache memory controller for storing tag values associated with data stored in said cache system, cache valid memory connected to said cache memory controller for storing a valid status of data stored in said cache system, and cache dirty memory connected to said cache memory controller for storing a signal indicating a dirty status of data stored in said cache system, said cache memory controller improperly controlling said cache tag memory under predetermined certain conditions, including performance of non-cacheable operations when snoop or cache flush operations are not occurring, wherein said cache dirty memory includes an output for providing a dirty status signal, wherein said cache memory controller includes an input for receiving a cache dirty status signal, wherein said processor includes an output for providing a page cacheable status signal indicative of a cacheable status of a page and inputs for receiving signals for releasing address lines and for releasing address, data and control lines, a circuit for causing said cache memory controller to properly control said cache tag memories comprising:

a first AND gate receiving at a first input said dirty status signal from said cache dirty memory and at a second input an indication developed from said page cacheable status signal that said page is not cacheable and providing an output signal;

a second AND gate receiving at a first input said dirty status signal from said cache dirty memory and at a second input an indication that said releasing address, data and control lines signal is asserted and providing and output signal;

a third AND gate receiving at a first input said dirty status signal from said cache dirty memory and at a second input an indication that said releasing address lines signal is asserted and providing an output signal; and an OR gate receiving the outputs of said AND gates at the inputs of said OR gate and having an output providing said cache dirty status signal to said cache memory controller wherein said circuit providing said cache dirty status signal under normal operations to said cache memory controller, said circuit masking said cache dirty status signal when a non-cacheable operation is occurring unless either a snoop operation or a cache flush operation is occurring so that said cache memory controller properly controls said cache tag memory.

* * * * *

UNITED STATES PATENT AND TRADEMARK OFFICE
CERTIFICATE OF CORRECTION

PATENT NO.    : 5,692,154

DATED         : 11/25/97

INVENTOR(S)  : BRIAN B. TUCKER, GARY W. THOME

It is certified that error appears in the above-identified patent and that said Letters Patent is hereby corrected as shown below:

IN CLAIM 1, LINE 18, PLEASE INSERT A SEMI-COLON AT THE END OF THE PARAGRAPH.

IN CLAIM 8, LINE 4, PLEASE INSERT A PERIOD AT THE END OF THE PARAGRAPH.

Signed and Sealed this

Twenty-fourth Day of February, 1998

Attest:

BRUCE LEHMAN

*Attesting Officer*      Commissioner of Patents and Trademarks